US005103108A

United States Patent [19]

Crimmins

[11] Patent Number: 5,103,108

[45] Date of Patent: Apr. 7, 1992

[54] DISTRIBUTED INFRARED COMMUNICATION SYSTEM

[76] Inventor: James W. Crimmins, 15 Nutmeg La., Wilton, Conn. 06897

[21] Appl. No.: 584,804

[22] Filed: Sep. 18, 1990

Related U.S. Application Data

[60] Division of Ser. No. 214,187, Jul. 1, 1988, Pat. No. 4,977,619, which is a continuation of Ser. No. 918,993, Oct. 1, 1986, Pat. No. 4,732,834.

[51] Int. Cl.⁵ .......... G01J 1/04

[52] U.S. Cl. .......... 250/338.1; 250/353

[58] Field of Search .......... 250/338.4, 338.1, 353, 250/338.3, 338.2

[56] References Cited

U.S. PATENT DOCUMENTS

| | | | |
|---|---|---|---|
| 4,379,971 | 4/1983 | Smith et al. | 250/338.3 |
| 4,443,701 | 4/1984 | Baily | 250/338.4 |
| 4,977,619 | 12/1990 | Crimmins | 455/607 |

FOREIGN PATENT DOCUMENTS

| | | | |
|---|---|---|---|
| 0217125 | 9/1987 | Japan | 250/338.4 |

*Primary Examiner*—Janice A. Howell

*Assistant Examiner*—Richard Hanig

*Attorney, Agent, or Firm*—St. Onge Steward Johnston & Reens

[57] ABSTRACT

A two way communication system is described wherein a base unit can transfer information with remotely-located unit such as a portable infrared communicator. The base unit produces carrier frequency signals to a plurality of distributed transmitter modules which expose different areas to infrared transmissions. A plurality of down-link or base unit associated infrared detection modules are distributed to receive infrared carrier frequency communications from one or more remote or portable units and convert these to electrical signals at the same carrier frequencies. The latter electrical signals are delivered to the base unit through a common cable. This cable also serves to deliver electrical power to the base unit to the latter modules. The electrical carrier frequency signals are combined at the base unit which uses this to provide the base unit with the information detected from the remote unit and produce a signal representative of the detected infrared energy. The latter signal may then be used to control the output power from the remote or portable units.

16 Claims, 8 Drawing Sheets

DISTRIBUTED INFRARED COMMUNICATION SYSTEM

This is a division of copending application Ser. No. 07/214,181, filed on July 1, 1988, now U.S. Pat. No. 4,977,619, which is a continuation of Ser. No. 06/918,993, filed Oct. 1, 1986, now U.S. Pat. No. 4,732,834.

FIELD OF THE INVENTION

This invention generally relates to a two-way infrared communication system for an enclosed space and more specifically to such a system with a plurality of infrared channels for use within a common enclosure such as an office, factory, or warehouse, and the like.

BACKGROUND OF THE INVENTION

A full two-way infrared telephone system exists as described in my copending U.S. patent application Ser. No. 619,803, now U.S. Pat. No. 4,757,553, filed June 12, 1984, entitled COMMUNICATION SYSTEM WITH PORTABLE UNIT. This patent application is incorporated herein by reference. The infrared telephone system uses a cordless handset that is portable as with rf cordless telephones. The infrared telephone system includes a base unit having an up-link infrared transmitter to send an audio FM modulated infrared carrier to the handset receiver and a base unit infrared receiver to detect an audio FM modulated infrared carrier back from a handset located infrared transmitter. Battery power of the portable handset is conserved by use of a power control circuit whereby the optical power from the handset, or down-link infrared transmitter, is kept at a minimum level needed to obtain good performance. This is achieved by sensing the level of the infrared signals at the infrared receiver in the base-unit and then varying the average frequency of the carrier applied in the base unit to the up-link infrared transmitter. This carrier frequency shift is sensed in the handset and used to vary the optical power from the handset completing a control loop. In the process the up-link carrier frequency is controlled at the center of the pass band of the handset infrared receiver.

SUMMARY OF THE INVENTION

In a two-way infrared communication system in accordance with the invention reliable and full coverage infrared communication can be established over variable length optical paths within an enclosed area such as an office, factory, storage area, telephone exchange, a vehicle and the like.

This is achieved in one embodiment in accordance with the invention with a base unit that is connected to a plurality of spatially distributed infrared transmitter modules and infrared receiver modules so that a portable, or down-link, infrared communicator may establish communication with the base unit. The optical power signal from the portable unit is controlled by detecting the level of the combined base receiver module output which is representative of optical power incident upon them. This detected level signal is relayed up-link by various means signals and is used to establish just enough optical power from the portable communicator to establish a satisfactory communication.

As further described herein, coaxial cables are used to transmit communication carrier signals between the modules and the base unit as well as provide electrical power to the modules. The modules may be connected in parallel and a large number can be used in a large area that is serviced by one base unit.

When optical power from the portable unit is controlled, its battery energy is conserved, the signal to noise ratio at the base receiver modules is held low at a fixed value and the base frequency of the plurality of the up-link transmitters is kept centered on the pass-band of the portable unit's receiver. The dynamic range of the optical power incident upon the base receiver modules can be kept within acceptable limits so that the most proximate up-link receiver module receives neither too little nor too much optical power.

With a communication system in accordance with the invention a plurality of such two-way infrared communication systems can be used within a common enclosure without causing an overload at any one down-link receiver and without interference between the channels. This is achieved in one embodiment by placing distributed base infrared receiver modules associated with the different channels in proximity to each other, with the same optical view. The same close placement is made with the up-link base transmitter modules of different channels.

In such case, when a portable unit is close to one of its associated infrared down-link base receiver modules, the automatic power control causes a cut back of the optical power from the portable unit and avoids excessively high optical power input to the also adjacent up-link infrared receiver module of the other channel.

If, this other channel, for example, happens to be in a high power demand mode, because its associated portable unit is at a remote location relative to an up-link receiver, the need to provide special skirt filters to avoid cross-talk problems and saturation of optical detectors are avoided. The combined received desired signal level incident on each receiver module group is at the same level as the combined interfering signal level. As further described herein, the proximity mounting of receivers of different channels and the power control feature enables use of a common up-link receiver module whose bandwidth is sufficiently wide to accommodate more than one channel. In such case the amount of cabling as well as the number of different modules can be advantageously reduced. Similarly, the colocation of transmitter modules which illuminate a common field assures equal desired as well as interfering signal levels at the portable unit's receiver. This condition can be conveniently tolerated with simple filtering.

It is, therefore, an object of the invention to provide a two-way infrared communication system for a variable optical path within an enclosure and which system provides reliable communication with conserved electrical power, a low level of complexity and is easily expandable and convenient and flexible to install and use. It is another object of the invention to provide multiple channel two-way infrared communication systems capable of operating within a common enclosure without interference between the channels while preserving battery power and the advantages of a single channel system.

These and other objects and advantages of the invention can be understood from the following description of several embodiments described with reference to the drawings.

DETAILED DESCRIPTION OF THE DRAWINGS

Figure 1:
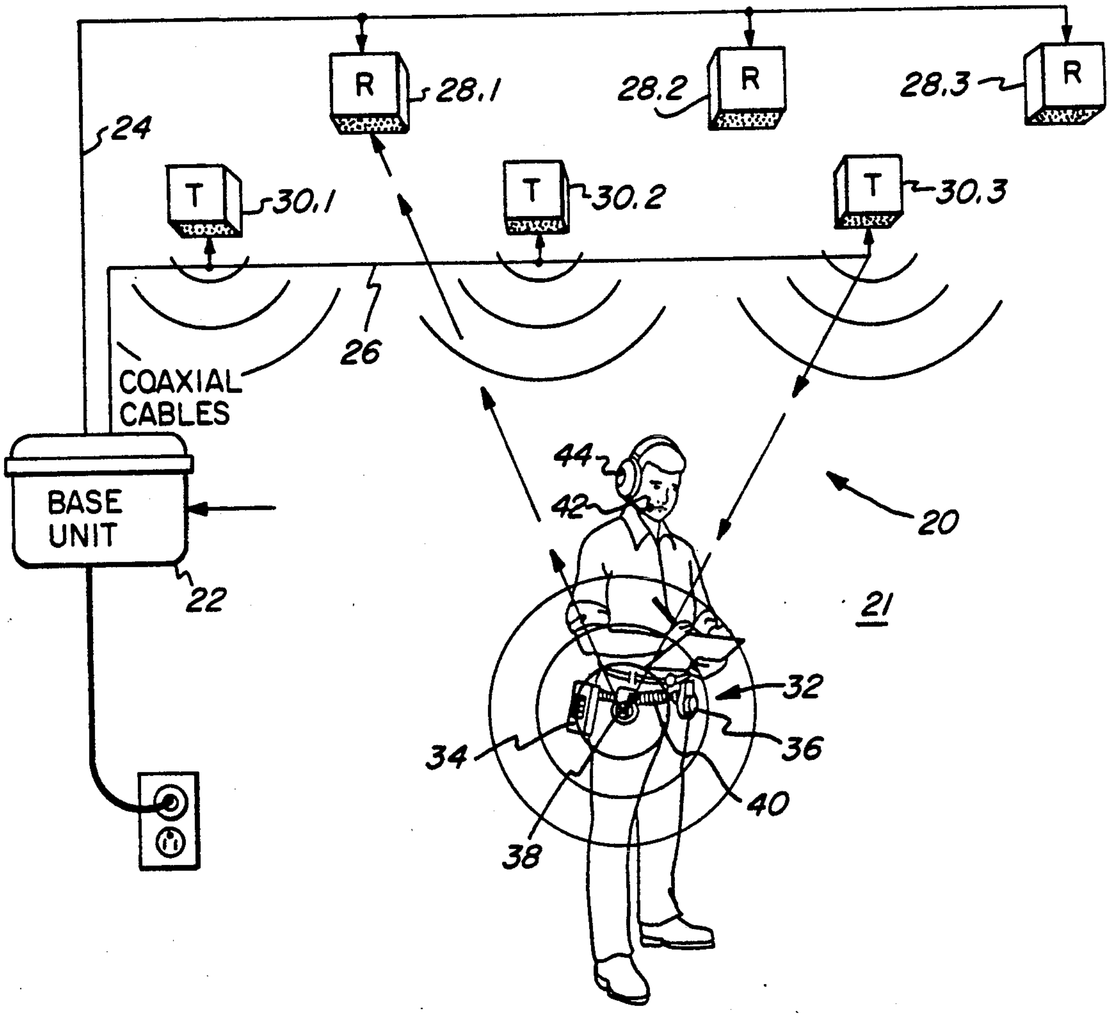
FIG. 1 is a block diagram representation of one infrared communication system in accordance with the invention.
Figure 7:
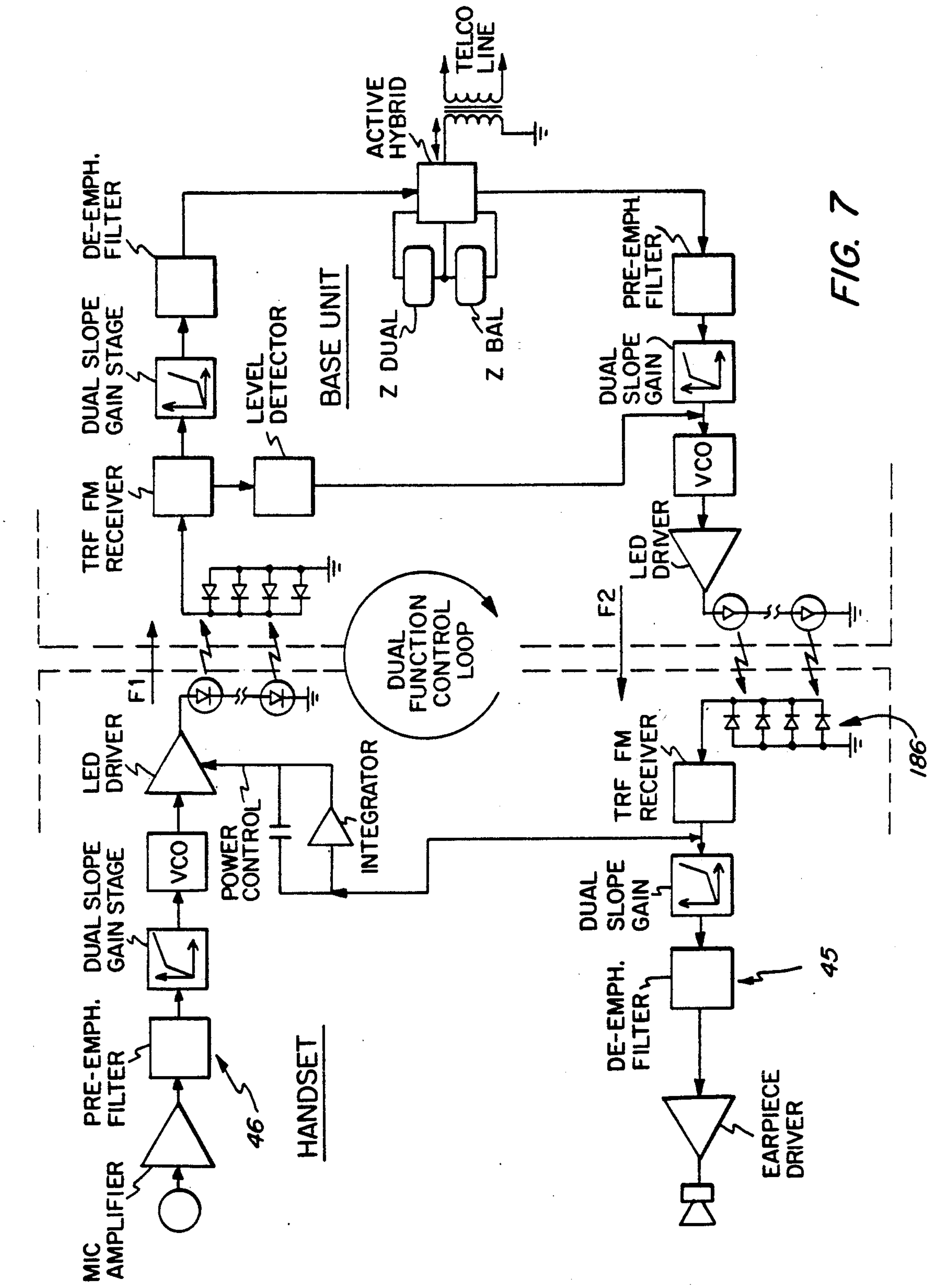
FIG. 7 is a block diagram of an infrared telephone system of which portions are used in an infrared communication system in accordance with the invention.

With reference to FIG. 1 an infrared communication system 20 in accordance with the invention is shown inside a room 21 and is formed of a base unit 22 that is coupled through coaxial cables 24, 26 to respective spatially distributed base unit infrared receiver modules 28 and up-link infrared transmitter modules 30. The system 20 enables infrared communication with a portable unit 32 held by a person as shown. Portable unit 32 is powered by a battery pack contained in a transceiver 34 and is formed with at least one up-link infrared receiver 36 and a down-link infrared transmitter 38. These infrared devices are mounted on a waist belt 40 that is conveniently worn as shown. In order to provide maximum spatial coverage a second receiver 36 and second transmitter 38 are placed (not shown) on the belt, preferably at diametrically opposite belt locations. These second down-link infrared devices are not always needed and may be deleted particularly when battery power is to be conserved. A microphone 42 is shown for providing audio signals for transmission via transceiver 34 and infrared transmitter 38 to any one of the infrared receiver modules 28 and thence via coaxial cable 24 to base unit 22. In the other direction, audio signals can be sent from base unit 22 via coaxial 26 to infrared modules 30, all of which simultaneously transmit so that portable unit infrared receiver 36 can provide appropriate audio to ear phone 44 via transceiver 34. The transceiver 34 includes circuitry as illustrated in FIG. 7 for the handset portion. This includes the FM receiver dual slope gain circuit (optional, filter and earpiece driver networks generally indicated at 45 for the receiver section and the amplifier, filter, dual slope gain (optional), VCO and infrared diode driver for the transmitter section 46. Instead of audio data can be transmitted between base unit 22 and portable unit 32.

In the system 20 many infrared receiver modules 28 and transmitter modules 30 can be added over very long coaxial cable lengths, which can be of the order of a thousand feet long. The modules 28, 30 are all connected in parallel and electrical power is supplied through the same coaxial cables 24, 26 through which the information signals flow.

Figures 2, 2A:
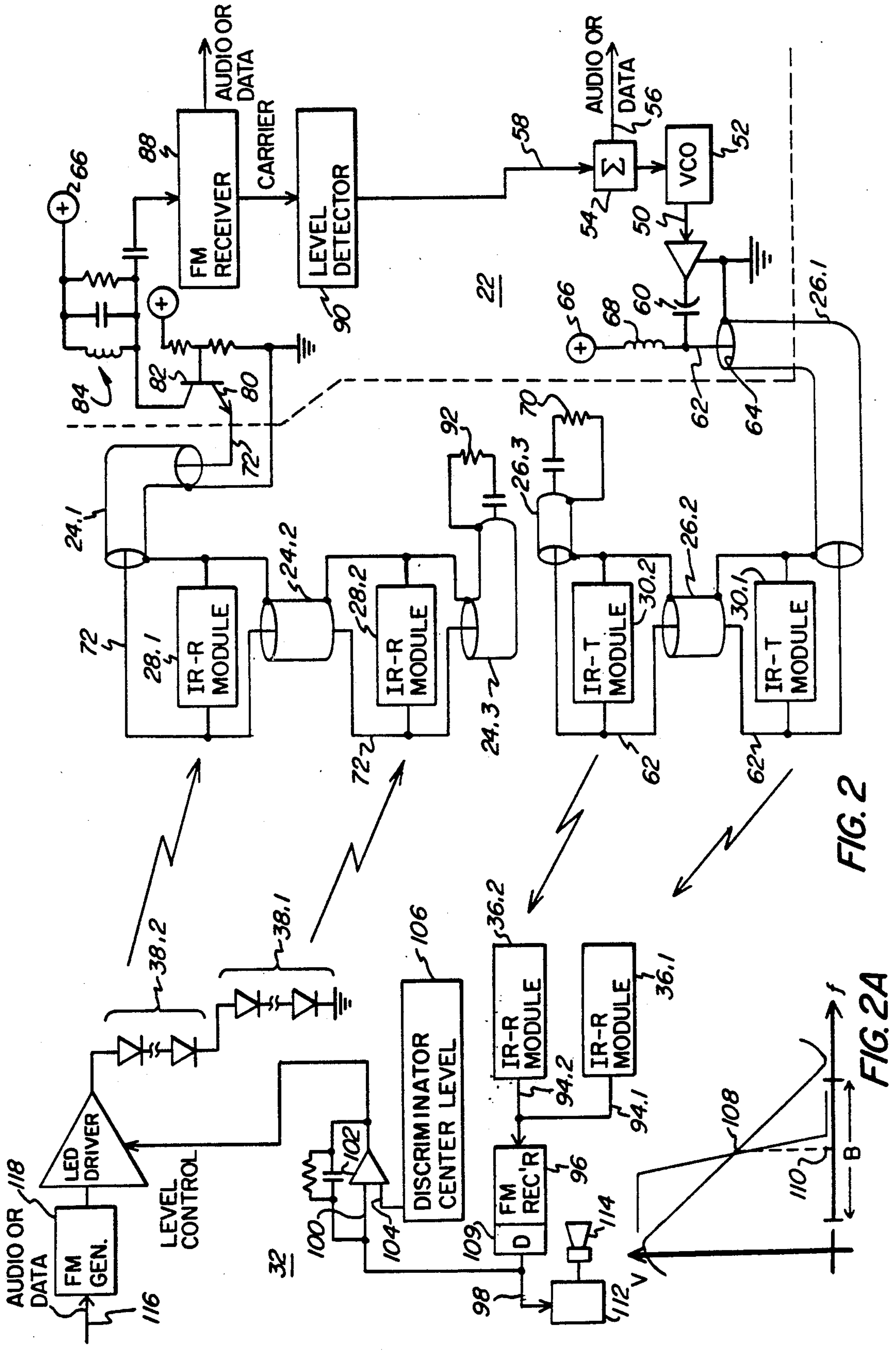
FIG. 2 is a more detailed schematic of the system of FIG. 1.
FIG. 2A is voltage-frequency plot of response characteristics used for optical power control of a portable or down-link infrared transmitter.

FIG. 2 illustrates the system 20 with greater detail. At base unit 22 appropriate FM modulated sinewave carrier signals are generated on a line 50 by a VCO (voltage controlled oscillator) 52 that is modulated by the output of a summing network 54. The latter has an audio or data input 56, such as from a telephone line as well as a power level control signal on line 58. A sinewave carrier is used to make synchronization of the transmitter modules 30 relatively immune to reflections in the coaxial cables 26.

The carrier signal is supplied through a DC blocking capacitor 60 to the central conductor 62 of coaxial cable 26 whose shield 64 is connected to ground. A dc voltage power source 66 is applied through an rf high impedance network such as a coil 68 to center conductor 62 of cable 26 to supply electrical power to up-link infrared transmitter modules 30.1 and 30.2. The coaxial cable 26 is shown connecting the modules 30 in parallel and a cable terminator 70 is used to reduce cable end reflections. The transmitter modules 30 act as high impedance loads to the carrier sinewave signal, yet can draw DC power from the same cable.

The receiver modules 28 associated with base unit 22 are so designed that electrical power is received from the center conductor 72 of coaxial cable 24. The receiver modules 28, however, act as constant current sources at carrier frequencies. Each receiver module 28 responds to incident infrared optical power by drawing a corresponding amount of current from an emitter 80 of a transistor 82. The emitter collector junctions are in series with the common central conductor 72. The total carrier current drawn through the emitter 80 thus in effect combines, by summing, the various signals indicative of the optical power incident on the individual modules 28.

A tank circuit 84 is used on the collector 86 and the carrier is ac coupled to an FM receiver 88. A signal is derived from receiver 88, such as from its rf stage, by a level detector 90 whose output is a DC level signal used to control the output power of the portable or down-link infrared transmitters 38.

DC power is supplied by power supply 66 through emitter 80 and the center conductor 72 to the modules 28. A DC blocked matching terminator 92 is used at the end of cable 24 to reduce reflections.

The portable unit 32 is designed so that it transmits no more than the optical power needed for a pre-set signal level at the base receiver module inputs. This is achieved by combining the portable receiver module outputs 94.1 and 94.2 at an FM receiver 96. The latter has a discriminator output 98 that is applied to one input 100 of a pseudo integrator differential amplifier 102. The other input 104 of amplifier 102 is connected to a DC reference level 106 that is set at the voltage level 108 (see FIG. 2A) that is generally at the center 110 (FIG. 2A) of the pass band B of the discriminator 109 in receiver 96. The output of amplifier 102 is applied to a driver for the portable unit transmitters 38.1 and 38.2 to cause a change in infrared output power in the direction required to compensate for the change in the level signal on line 58 in base unit 22 while keeping the carrier frequency centered on the pass band of the portable receiver modules.

With such optical output power control, battery drain can be held to a minimum level consistent with good performance. The gain of the loop is sufficiently high to restrict carrier excursions to a range equal to about ten percent of the receiver bandwidth. Automatic tracking to the remote's band center is obtained.

The audio part of the output from discriminator 109 is applied through appropriate networks and amplifier 112 to an earphone 114.

Audio signals from microphone 42 (see FIG. 1) are applied in FIG. 2 on line 116 to an FM carrier modulator 118 which has its output in turn applied to down-link infrared transmitter 38.

A particularly advantageous feature of the control loop for the infrared optical power is that it establishes in effect a generally constant signal to noise ratio at the down-link or base unit receivers 28.

This is desirable for voice recognition systems and other systems which are sensitive to noise and require removal of its effect for activities such as voice analysis or voice controlled switching.

Figure 3:
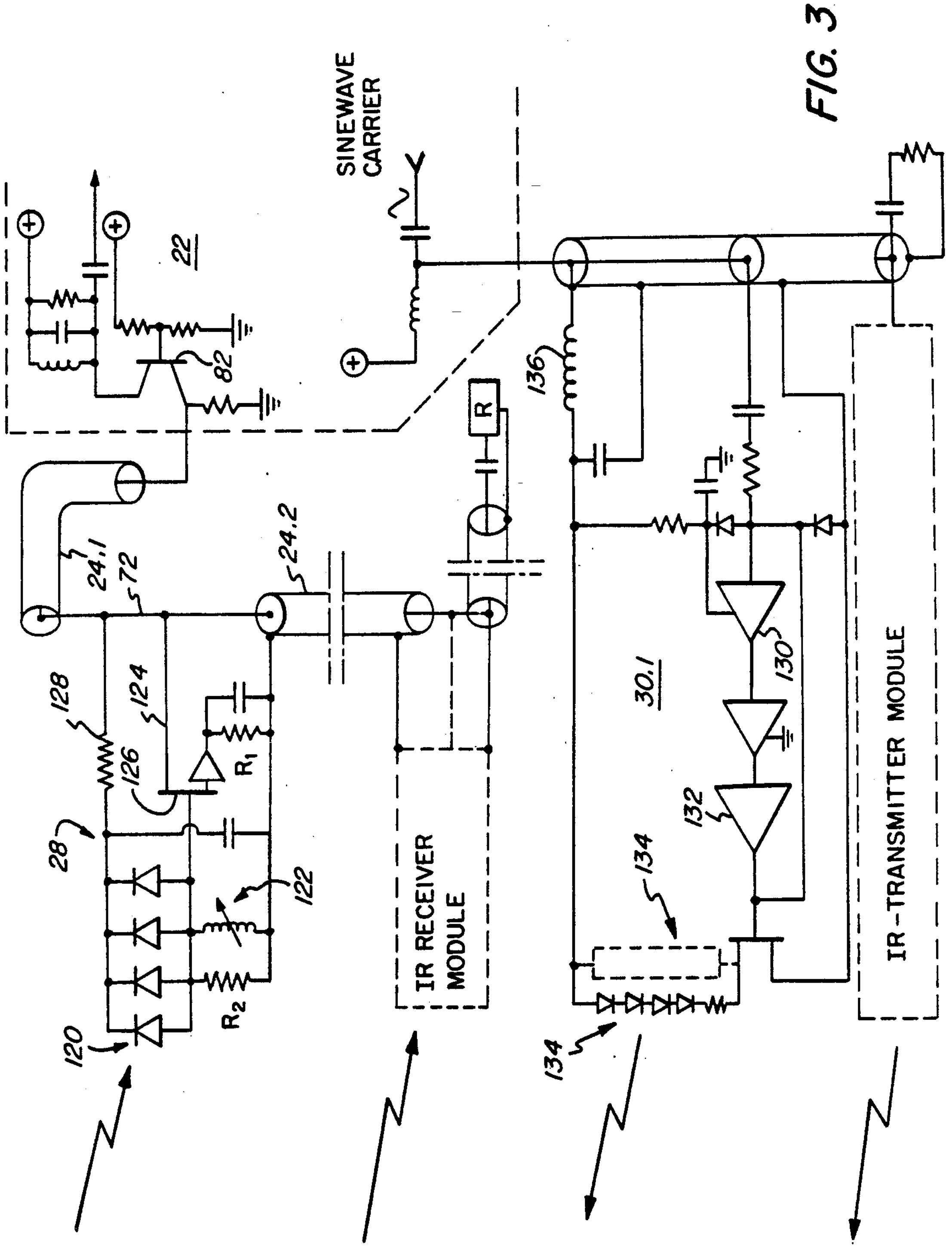
FIG. 3 is a more detailed schematic view of infrared receiver and infrared transmitter modules used in the system of FIG. 1.

FIG. 3 illustrates the base unit receiver module 28 and transmitter module 30 with greater detail The receiver module 28 includes a plurality of infrared sensitive diodes 120 in parallel and in series with a tank circuit 122. The drain 124 of an FET 126 acts as a constant current signal source to center conductor 72 but at carrier frequencies. Electrical DC bias for the photodiodes is supplied through resistor 128.

The transmitter module 30 has a limiter 130 and a logic amplifier 132 to drive infrared output diodes 134. Electrical DC power is supplied through a high rf impedance coil 136.

Figure 4:
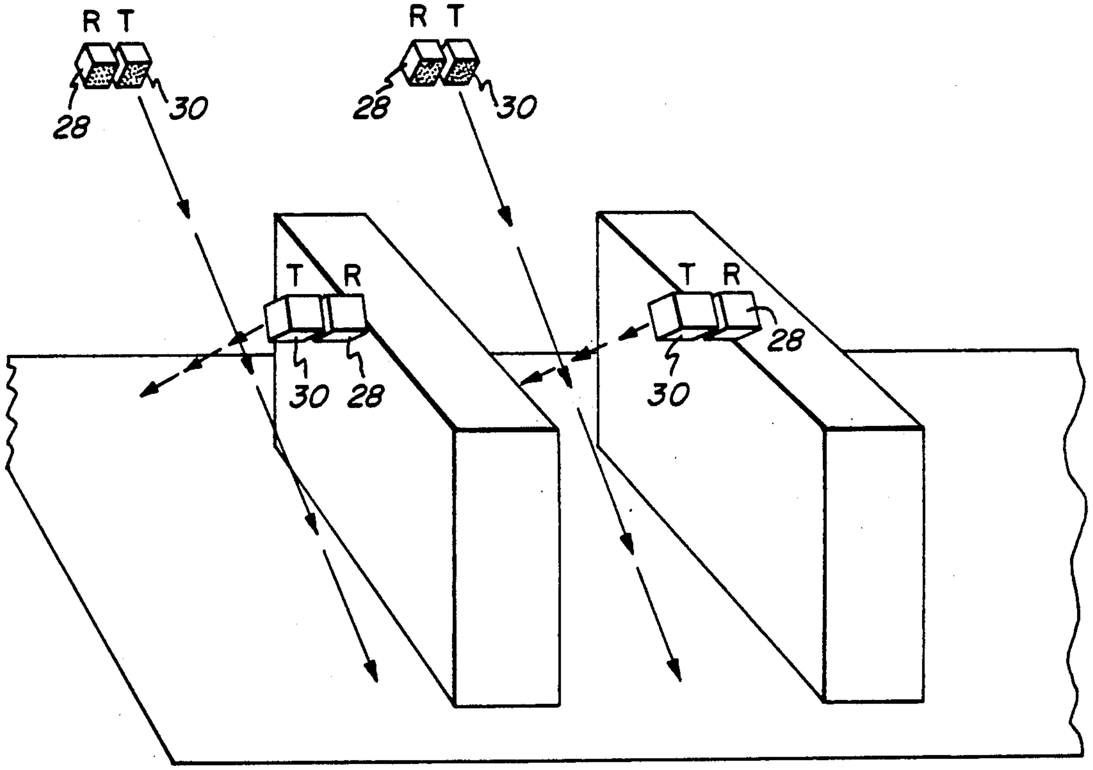
FIG. 4 is a perspective broken away view of a multiple infrared transmitter and receiver module system in accordance with the invention.
Figure 5:
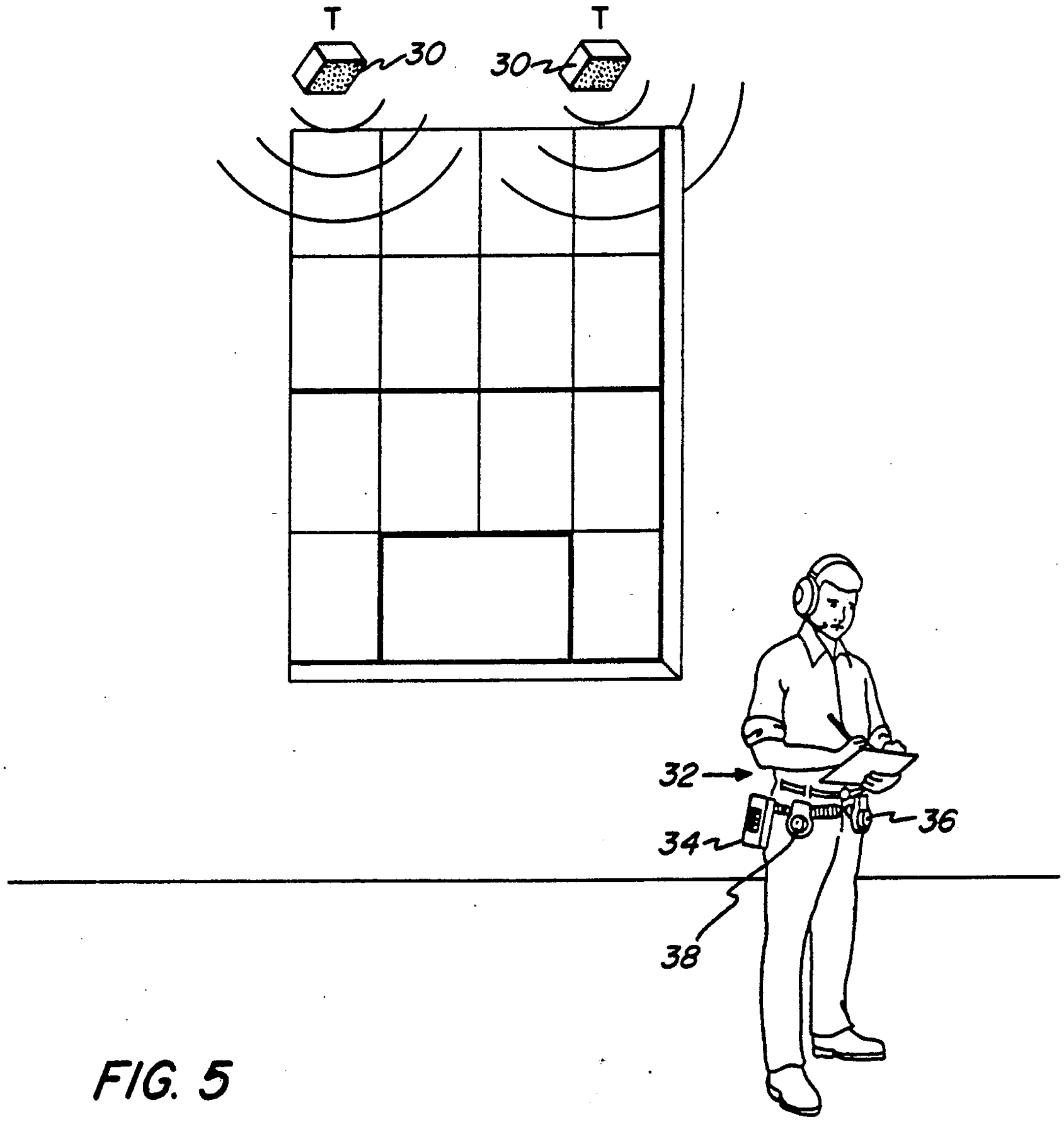
FIG. 5 is a perspective view of multiple infrared transmitters as used near a window to an enclosure.

FIGS. 4 and 5 illustrate various configurations and placements of base unit transmitter modules 30 and receiver modules 28 in an enclosed space to assure adequate infrared communication with a portable unit 32.

Figure 6:
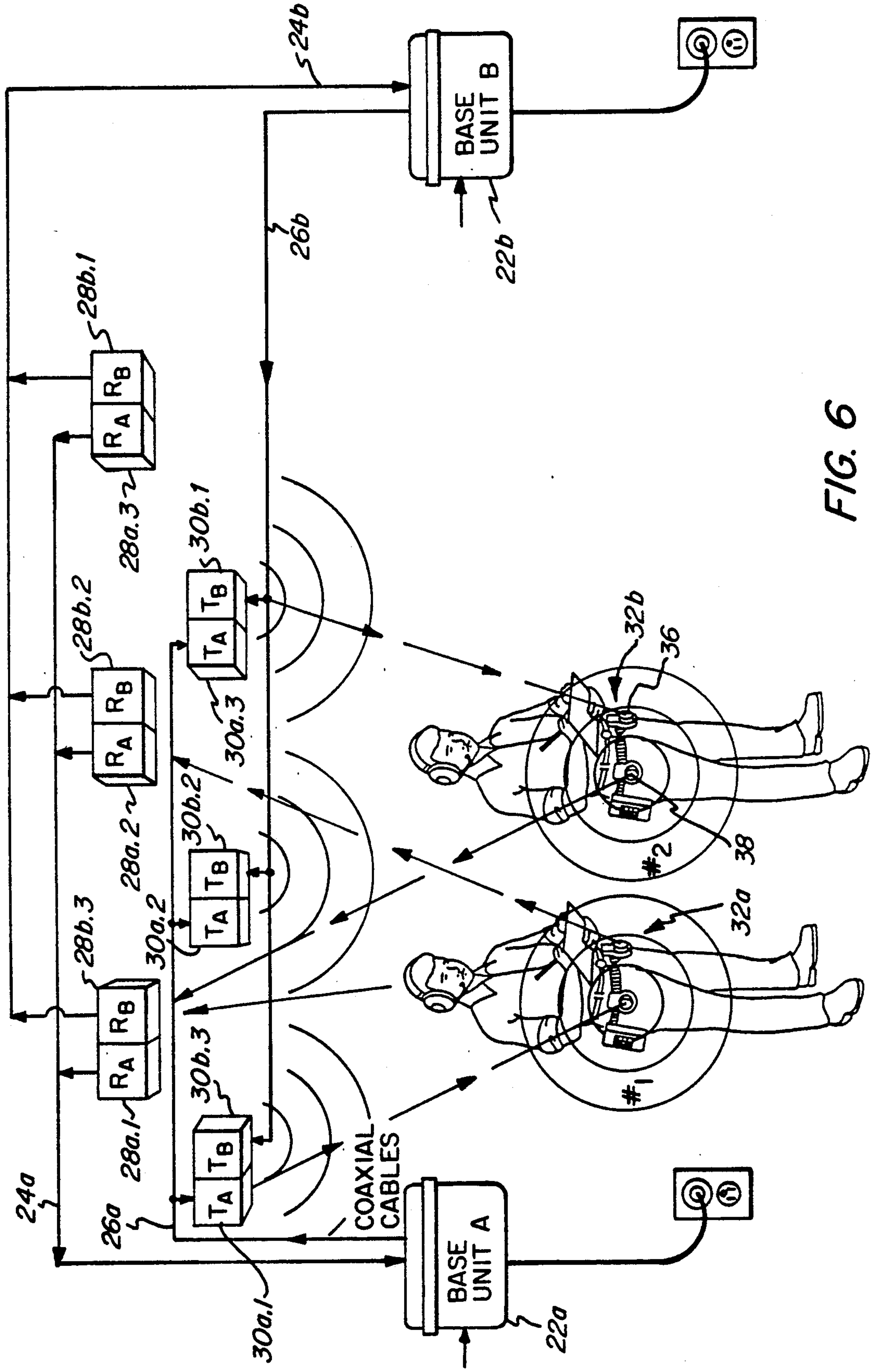
FIG. 6 is a partially perspective infrared communication system in accordance with the invention with a plurality of different communication channels inside the same room.

With reference to FIG. 6 an infrared two-way communication system 150 is shown including two separate channels A and B operating at different carrier frequencies. Each channel includes a base unit 22 and a plurality of infrared receiver modules 28 and infrared transmitter modules 30, connected in parallel to coaxial cables 24 and 26 respectively.

In system 150, however, the base unit receivers 28*a* and 28*b* are mounted in proximity to each other so as to effectively have the same field of view. The same pairing is done with infrared transmitters 30*a* and 30*b*. In system 150 the infrared power control loop is essential. Since each channel controls its respective portable unit's output optical power, the received infrared signal is constant at a predetermined level. As a result spurious responses, interfering crosstalk, and intermodulation effects are reduced to a negligible level with only a moderate amount of selectivity required to be incorporated that can be implemented with simple circuits.

Hence, interfering signal levels that could be up to 80 db higher than the desired signal level, as might occur in certain locations and orientations of the portable units, are avoided. Such 80 db disparity is well beyond the infrared power/current linearity characteristics of silicon photodiodes and would introduce intermodulation effects that would not be removable with filtering.

The same problems exist for the portable units 32. Hence, the paired location of the base unit transmitter modules at each site forces the desired and interfering signals at each portable receiver to be equal and, therefore, reduces interference and intermodulations.

Since the receiver modules from all systems are closely spaced at each site, it is possible to use a single receiver module for all the systems provided it has a sufficiently broad pass band. By reducing R2 to a value of R2/n (See FIG. 3.), where n is the number of systems or channels, the bandwidth can be made sufficiently wide to accommodate signals from all the portable transceivers. The resulting effect on sensitivity is as follows:

For systems located in environments where the effect of in-band ambient optical noise is substantially greater than the electronic thermal noise of R2, then reduction of R2 will have no effect on system sensitivity (in effect the signal to noise ratio).

When the effect of ambient optical noise is less than the electronic noise of R2, then reducing R2 to R2/n will degrade the signal voltage to noise voltage density ratio (E/(V/{$H_z$}), by a factor 1/{n. To retain the same system sensitivity, the photodiode area (or number) must increase by a factor of n (the equivalent of n receiver modules).

By using a common receiver module 28, n−1 coaxial cable runs are eliminated and a common field of view is assured. In addition n−1 receiver modules are eliminated. In the latter case the modules are replaced by a larger receiver module, having n times the original receiver module diode area.

Since transmitter (T) modules 30 from all systems are located at each T module site, it is also advantageous to employ a single transmitter module for all systems provided intermodulation of transmitter carriers is held to acceptable levels.

Figure 8:
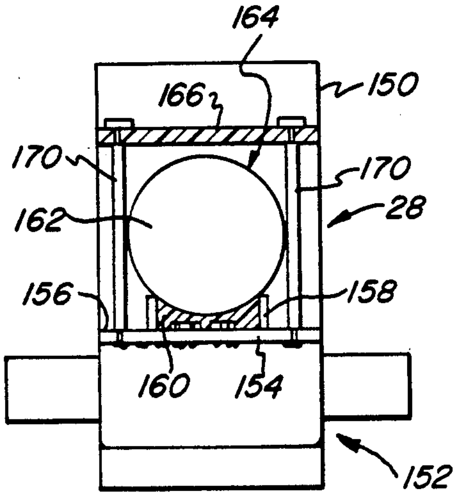
FIG. 8 is a side section view in elevation of a base unit receiver module.
Figure 10:
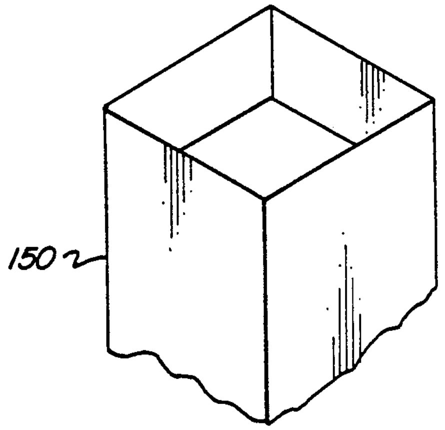
FIG. 10 is a partial perspective view of the receiver module of FIG. 8.
Figure 9:
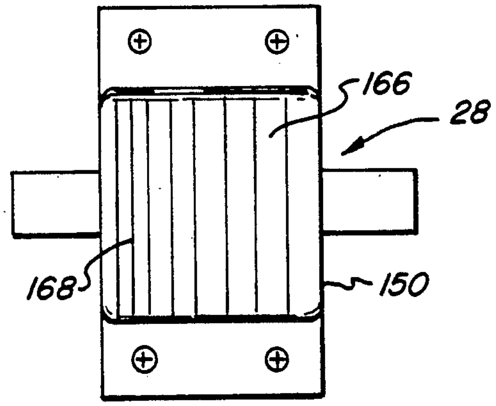
FIG. 9 is a top plan view of the base unit shown in FIG. 8.

The down-link or base unit receiver modules 28 have an appearance as illustrated in FIGS. 8–10. A generally open ended channel casing 150 made of a reflective metal is closed at one end 152 by a metal cap. A base unit infrared receiver circuit is mounted on a circuit board 154, the top of which also has a ground plane 156 that is electrically connected to casing 150.

The array 120 of silicon photodiodes that are sensitive to infrared are surrounded by a plastic ring 158. The diodes face upwardly to receive and detect infrared light. The ring 158 is adhesively mounted to board 154 and a clear, infrared transparent epoxy material 160 is placed inside the ring 158. An infrared transparent ball 162, made of an acrylic material, is placed in the epoxy, which bonds to it. Since the refractive indices of the epoxy 160 and ball 162 are almost the same, the infrared light capturing capability of the diodes is enhanced without air/surface interfaces.

The optical structure 164 is covered by an infrared transparent plastic plate 166 made of a plastic known as Lexan a polycarbonate plastic, the inside of which is provided with a fine grid 168 of conductive material that forms a faraday shield. Conducting stand-offs 170 provide electrical conduction between the grid 168 and ground plane 156. Hence, the high output impedance photodiodes are mounted within a faraday shield to protect them from stray electrical fields while allowing infrared light to pass through.

The recessed mounting of the optical structure 164 within casing 159 forms a "dead-air" pocket enabling an essentially dust free mounting when tilting the receiver module relative to the vertical in a manner as illustrated in FIGS. 4 and 5.

The up-link transmitter modules also are mounted in a casing such as 150. However, the complex optical structure 164 is not used and its cover plate 166 is more deeply recessed. A wide effective field of view is still obtained by virtue of the multiple reflections by the inside of casing 150.

Figure 11:
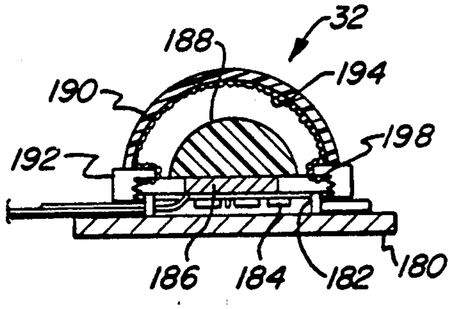
FIG. 11 is a side section view of a portable unit's infrared receiver.

The portable unit 32 infrared receiver 36 has a construction as shown in FIG. 11. A flanged metal cup 180 and 182, externally threaded, enclosed the infrared receiver circuit. The circuit includes a plurality of infrared sensitive photodiodes 186, as illustrated in the schematic block diagram of FIG. 7. A hemispherically shaped lens 188 is placed above the diodes 186 and directly bonded thereto with an epoxy or another suitable clear adhesive that eliminates air interfaces.

An infrared transparent hemispherical enclosure 190, having a lower metal rim 192, is used to cover the lens 186 and circuitry as shown. A faraday shield is obtained by placing a wire mesh 194 along the inside of the cover 190. The mesh 194 is selected to cause as little light blockage as possible while still protecting against electrical interference. A mesh of one mil wires at ten mil spacings was found effective and blocked only 20 percent of the light. The lower rim of the mesh 194 is connected to an annular metal tape with a conductive adhesive 198 which makes electrical contact with the upper edge of metal ring 182 when rim 192 of cover 190 is screwed onto the ring 182.

An infrared transmitter 38 on portable unit 32 has a similar construction as FIG. 11 except it has only photodiodes such as at 200 in FIG. 7 and no faraday shield. In one embodiment two infrared transmitters 38 are used, one with five infrared generating photo diodes, the other with four. The diodes 200 of both transmitters 38 are connected in series by use of suitable wires embedded in the belt 40 (See FIG. 1) and emanating from and returning to transceiver 34.

Having thus described several embodiments of the invention, its advantages can be appreciated. Variations can be made without departing from the scope of the following claims. For example, other techniques can be used to establish control over the power of the portable unit's infrared output power. For example, inaudible control tones could be used.

The embodiments described herein illustrate a portable unit 32 that is battery powered and moveable depending upon where the person carrying it moves. It should be understood, however, that other configuration are contemplated by the invention. Hence, the term portable as used herein means an infrared transmitter and receiver device which may be powered by line power, and may be movable, rotatable or with undefined orientations at a fixed location. As such, the optical path loss is variable or otherwise undefined so as to be unpredictable.

The embodiment described depicts base systems with a single run of coaxial cable tapped by parallel connected receiver modules or transmitter modules. The general method, however, permits use of twisted pair wiring (instead of coaxial cable) in some installations. In addition, since the carrier frequencies can be quite low (50 KHz to 2 MHz), virtually unlimited branching of cables is possible permitting high flexibility of configuration.

What is claimed is:

1. An infrared communication sensor for detecting modulated infrared carrier radiation, comprising:

infrared detecting means for generating an electrical signal in response to modulated incident infrared radiation and representative of the modulation thereof;

an infrared transparent cover located over the infrared detecting means, and an infrared transparent Faraday shield located between the incident infrared radiation and the infrared detecting means and spaced therefrom to shield the latter against extraneous electric fields.

2. The infrared sensor as claimed in claim 1 wherein the faraday shield comprises a grid of electrical conductors.

3. The infrared sensor as claimed in claim 1 wherein the grid of electrical conductors are spaced and sized so as to obscure less than about twenty percent of the incident infrared radiation.

4. The infrared sensor as claimed in claim 1 wherein the faraday shield is located between the cover and the infrared detection means.

5. The infrared sensor as claimed in claim 2 and further including:

a conductive housing surrounding the infrared detecting means and having an open port through which incident infrared radiation arrives, said grid of electrical conductors being located between the infrared detecting means and the open port and being electrically grounded.

6. The infrared sensor as claimed in claim 5 wherein the infrared detecting means is located in a recessed position within the housing with the infrared transparent cover also being in a recessed position inside the housing to sealingly protect the infrared detecting means from dust and particles.

7. The infrared sensor as claimed in claim 5 wherein the housing on the inside thereof has an infrared radiation reflecting surface.

8. The infrared sensor as claimed in claim 7 wherein the infrared detecting means includes a plurality of photo detectors and an infrared transparent spherically-shaped lens element interposed between the photodetectors and the cover and means for optically coupling the element to the photodetectors without air/surface interfaces.

9. The infrared sensor as claimed in claim 8 wherein the element is a hemispherically-shaped lens.

10. An infrared communication sensor for detecting modulated infrared carrier radiation, comprising:

a plurality of photodetectors;

an infrared transparent lens element having an externally curved surface to gather infrared light, said lens element being positioned to overly the photodetectors so as to effectively enlarge their optical viewing angle; and an infrared coupling material interposed between the photodetectors and the lens element to couple infrared light passing therethrough to the photodetectors and affix to the lens element.

11. The infrared sensor as claimed in claim 10 and further including a rim extending above the photodetectors and surrounding the photodetectors, said infrared coupling material being placed within the rim to a height sufficient to cover the photodetectors and enable adherence to the lens element.

12. The infrared sensor as claimed in claim 10 and further including an infrared transparent faraday shield over the lens element.

13. The infrared sensor as claimed in claim 10 wherein the lens element has a spherically shaped surface facing the faraday shield.

14. The infrared sensor as claimed in claim 13 wherein the lens element is a hemispherically shaped lens.

15. The infrared sensor as claimed in claim 13 wherein the lens element is a sphere.

16. The infrared sensor as claimed in claim 12 and further including an infrared reflective material surrounding said lens element to enlarge the viewing angle of the photodetectors.

* * * * *